United States Patent Office 3,536,364
Patented Oct. 27, 1970

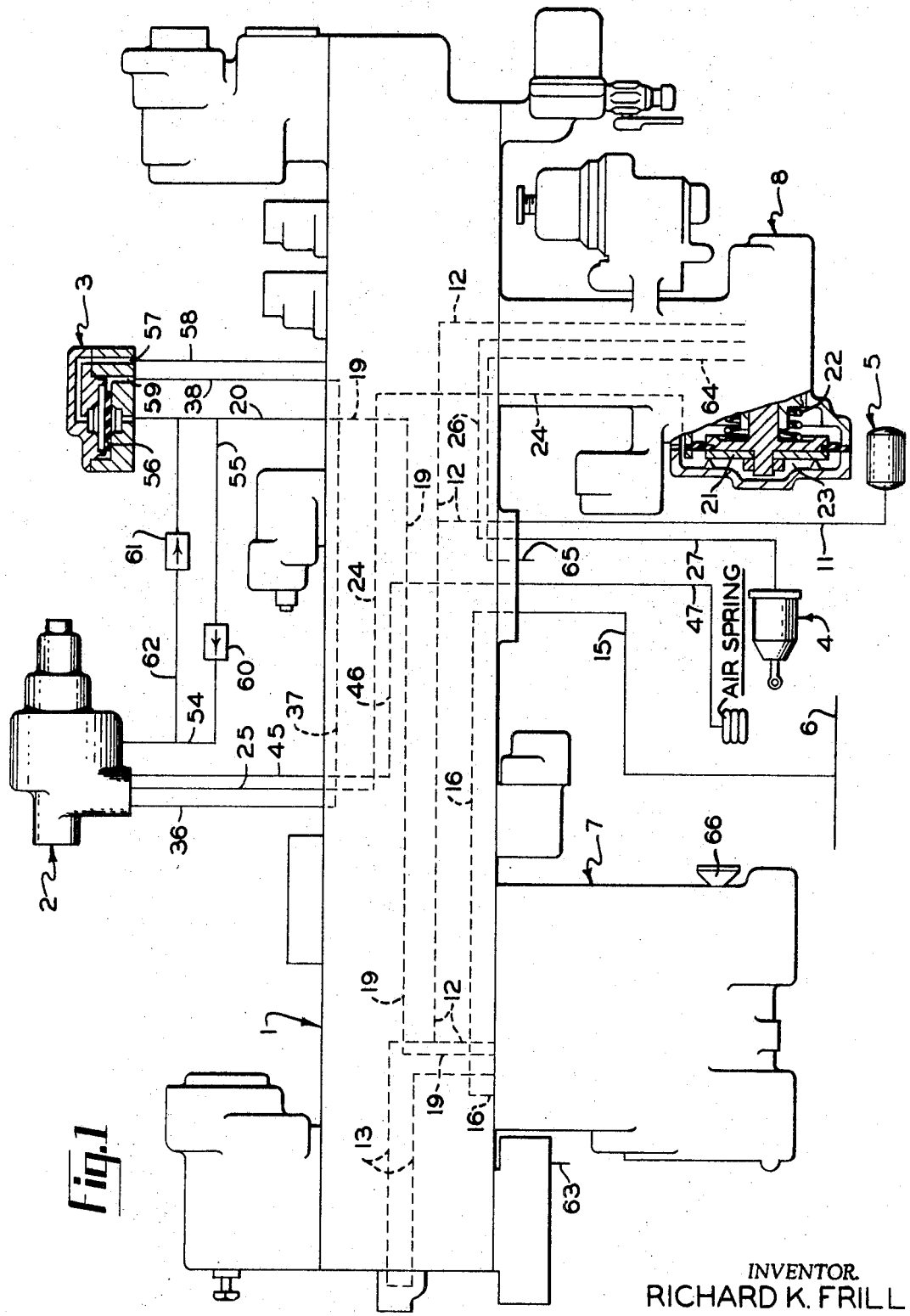

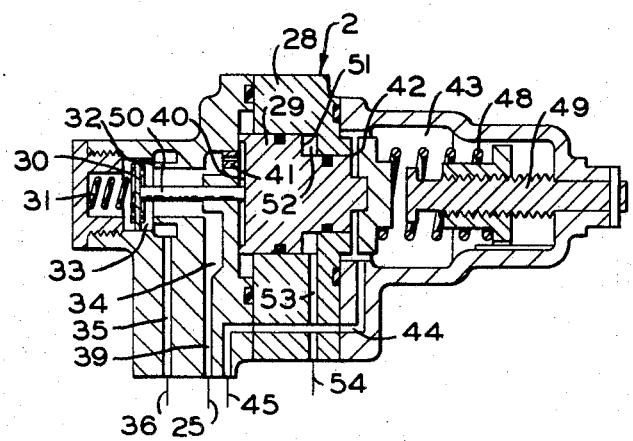
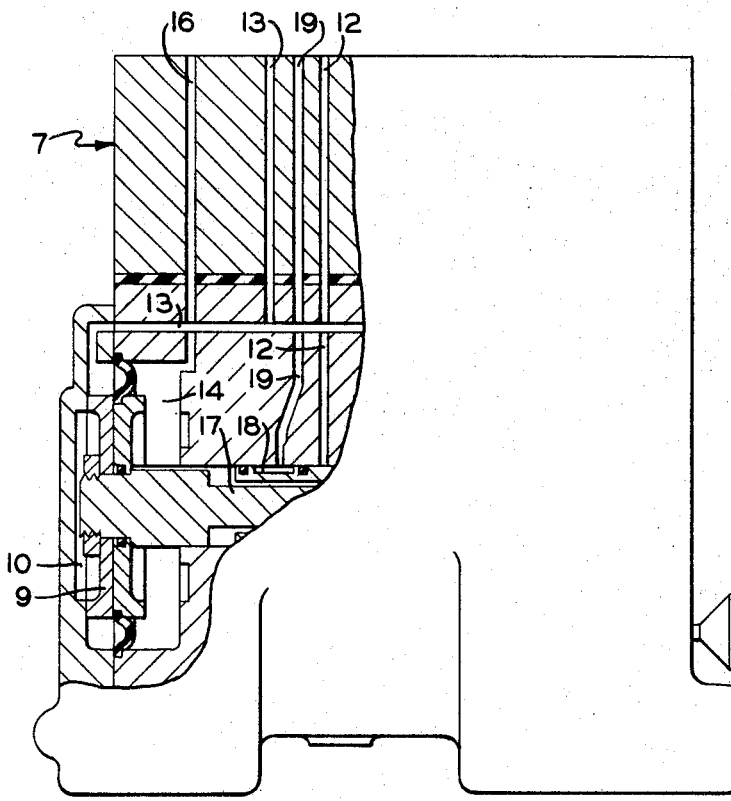
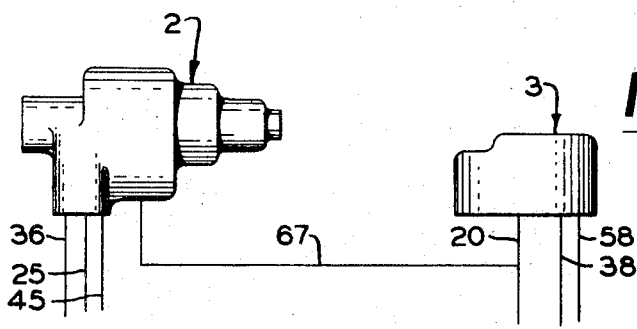
INVENTOR.
RICHARD K. FRILL

3,536,364
VARIABLE LOAD BRAKE CONTROL APPARATUS
Richard K. Frill, Pittsburgh, Pa., assignor to Westinghouse Air Brake Company, Wilmerding, Pa., a corporation of Pennsylvania
Filed Mar. 14, 1969, Ser. No. 807,311
Int. Cl. B60t 8/18
U.S. Cl. 303—22
8 Claims

ABSTRACT OF THE DISCLOSURE

Variable load brake control apparatus for effecting delivery of actuating fluid to a vehicle brake cylinder at a pressure according to a control pressure established by the vehicle operator for effecting a brake application at a degree corresponding to the established control pressure, said variable load brake control apparatus including means for limiting the pressure of control fluid, and therefore that of the actuating fluid delivered to the brake cylinder, to a maximum pressure commensurate with the load condition of the vehicle, and being further characterized by means automatically responsive to an emergency brake application for effecting a pressure increase of a predetermined degree over said maximum pressure limit and, thereby, a corresponding increase in the degree of brake application effected during an emergency situation.

BACKGROUND OF INVENTION

As is well known, the purpose of load-compensated brake control apparatus such as on a multicar train, for example, is to effect a brake application on each car comensurate with the load condition of the respective car, whereby a high degree of retardation may be obtained without inducing wheel slipping or sliding. This objective has been attained by the use of brake control apparatus including a variable load valve device, for example, which is affected by the load condition of the vehicle (as reflected by the degree of air spring pressure, if air springs are used, or by the vertical height between the sprung and unsprung portions of the vehicle, if mechanical springs are used) to control the degree of actuating pressure delivered to the brake cylinder accordingly. This type of apparatus, however, limits the respective maximum braking pressures proportionally for both service and emergency applications.

The load-compensated brake control apparatus, above described, has been further modified so that an additional in increment or higher degree of braking pressure is obtained for an emergency application as compared to a service application. In an emergency situation, such higher degree of braking pressure is desirable notwithstanding that wheel slipping or sliding may occur, and, therefore, the apparatus must be modified accordingly. In some apparatus, for example, the variable load valve device, which usually has a primary pressure area constantly subjected to air spring pressure for accordingly determining the degree of the service application when effected, is also provided with a secondary pressure area which is subjected to air spring pressure when an emergency brake application is effected, thereby supplementing the effect of air spring pressure acting on the primary pressure area for effecting delivery of a higher braking pressure to the brake cylinder during an emergency application. Usually a relay valve device, which is connected to and controlled by pressure in the brake pipe, causes the secondary pressure area of the variable load valve device to be subjected to air spring pressure when a complete reduction of brake pipe pressure is made in initiating an emergency brake application.

Characteristic of the load-compensated brake control apparatus, immediately above described, is the fact that the additional increment of braking pressure produced on each car during an emergency application may vary in degree from car to car because the degree of such increment is determined by the air spring pressure of each car, which, in turn, is determined by the respective load of each car. Thus, even though the variable load brake control apparatus above described does operate to provide balanced braking action among the several cars throughout the train during a service application, such balanced braking action is not insured during an emergency brake application due to the variance in degree of the respective additional increments of braking pressure effected among the several cars.

SUMMARY OF INVENTION

The object of the present invention, therefore, is to provide a variable load brake control apparatus requiring very little modification of existing brake equipment and being characterized by means for establishing an additional increment of braking pressure int he brake cylinder during an emergency brake application, such increment being of a predeterminable value in excess of the maximum emergency braking pressure effected, such predeterminable value of each increment being the same for each car, notwithstanding that the respective degree of air spring pressures prevailing in the several cars may vary from car to car in accordance with variations in the load on the cars.

According to the invention, which employs a variable load valve device of the type above described having a supplemental pressure area in addition to the primary pressure area constantly subjected to air spring pressure, said supplemental pressure area is connected by a pipe to the communication via which emergency control pressure is delivered from the emergency portion of the brake control valve device to the relay portion when an emergency brake application is effected. Thus, each time an emergency brake application is initiated, the supplemental area, which is disposed on a piston-valve member of the variable load valve device, is also subjected to emergency control pressure delivered to the relay portion. The supplemental pressure area is arranged on the piston-valve member in such a manner that, when subjected to such emergency control pressure, the force provided thereby acts to supplement that of the air spring pressure acting on the primary pressure area disposed at one end of said piston-valve member. Consequently, the varaible load valve device operates responsively to the combined effect of the respective pressure acting on the primary and supplemental pressure areas to cause a correspondingly higher pressure to be delivered to the relay portion of the brake control valve device and, therefore, effect a correspondingly higher degree of braking effort. And, since emergency control pressure is always the same degree for the particular braking equipment used, the incremental increase in braking effort during an emergency application is also the same each time an emergency application is effected. The degree of such incremental increase may be limited to a preselected lesser value, if deemed desirable, by use of a valve device or other suitable means interposed in the pipe communicating emergency control pressure to the supplemental pressure area of the variable load valve device, whereby the degree of emergency control pressure reaching said supplemental pressure area is limited to a preselected value.

In the drawings, FIG. 1, with certain portions shown in section, is a schematic view of braking equipment for a railway vehicle incorporating the invention; FIGS. 2 and 3 are elevational views, in section and on a larger scale than FIG. 1, of certain components of the equipment shown in FIG 1; and FIG. 4 is a view, in outline, of a fragmentary modified portion of the equipment shown in FIG. 1.

DESCRIPTION AND OPERATION—FIGS. 1, 2 AND 3

For purposes of illustrating the application and function of the invention herein disclosed, the brake equipment to which the invention is illustratively applied, but not necessarily limited thereto, as shown in FIGS. 1, 2 and 3, comprises a portion of the RT-2 brake equipment described and illustrated in pamphlet number G-g-5063-12, dated July, 1966, and published by Westinghouse Air Brake Division of Westinghouse Air Brake Company, Wilmerding, Pa.

Since sufficient descriptive details for a thorough understanding of the invention incorporating the brake equipment shown in FIGS. 1, 2 and 3 will be set forth hereinafter, further reference to the above-identified pamphlet is not considered essential to an understanding of the invention.

The brake equipment shown in FIG. 1 and embodying the invention is normally mounted on a railway vehicle or car and comprises a brake control valve device 1, a variable load valve device 2, which is shown in section in FIG. 2 of the drawings, a double check valve device 3, a brake cylinder device 4, a source of fluid under pressure or supply reservoir 5 and a brake pipe 6.

The brake control valve device 1 comprises, among other components, an emergency valve portion 7, shown partly in section in FIG. 3 of the drawings, and a relay valve portion 8, shown partly in section in FIG. 1.

The emergency valve portion 7, as best seen in FIG. 3, comprises a piston 9 subjectable on one side to fluid pressure in a chamber 10 adjacent thereto, said chamber being changeable with fluid under pressure from the supply reservoir 5 via a pipe 11 and two connecting passageways 12 and 13 formed in the brake control valve device 1. The opposite side of piston 9 is subjectable to fluid pressure in a chamber 14 adjacent thereto, said chamber being chargeable with fluid under pressure from the brake pipe 6 via a connecting pipe 15 and a passagway 16 formed in the control valve device 1, said brake pipe pressure being normally equivalent to that of the supply reservoir 5. When chambers 10 and 14 are charged with fluid pressure, chamber 14 is charged ahead of chamber 10 (the manner of such charging not being considered essential to an understanding of this invention). The piston 9, therefore, during such charging, which occurs during the brake releasing operation of the equipment, is moved to a release position in which it is shown in the drawing. Since chamber 10 is subsequently charged with fluid from reservoir 5 at the same pressure as that in chamber 14, so that the pressures on opposite sides of piston 9 are balanced, said piston is maintained in its release position by frictional resistance of a spool valve 17 associated and movable therewith.

The spool valve 17 is provided with an annular groove 18 which, upon sufficient movement of piston 9 in a right-hand direction, as viewed in FIG. 3, to an emergency application position (which occurs upon reduction of brake pipe pressure in brake pipe 6 and, therefore, in chamber 14 when an emergency brake application is effected), serves to make connection between passageway 12 and a passageway 19, also formed in the control valve device 1, for a purpose to be hereinafter disclosed. Passageway 19 is connected by a pipe 20 with the double check valve device 3.

The relay valve portion 8, as best seen in FIG. 1, comprises a piston 21 urged in left-hand direction, as viewed in the drawing, toward a release position, in which it is shown in the drawing, by a spring 22 acting on the one side thereof. The opposite side of piston 21 is subjectable to control fluid pressure deliverable to a chamber 23 adjacent said opposite side via a passageway 24 formed in the control valve device 1, said passageway being connected by a pipe 25 to the variable load valve device 2. Self-lapping valve mechanism (not shown) is operably associated with the piston 21, and is effective in the release position of said piston to interrupt communication between a branch of passageway 12 and a passageway 26 connected by a pipe 27 to the brake cylinder 4. When the force of control fluid pressure delivered to chamber 23 and acting on piston 21 exceeds the opposing force of spring 22, said piston and the self-lapping valve mechanism are moved to an application position and a supply position, respectively, in which passageway 12 is placed in communication with passageway 26. With passageway 26 in communication with passageway 12, fluid under pressure is delivered from the supply reservoir 5 to the brake cylinder 4 at a pressured determined by the degree of control pressure delivered to chamber 23 for thereby effecting a brake application of a corresponding degree.

The variable load valve device 2, as best seen in FIG. 2, comprises a multisectioned casing 28 having operably disposed therein a piston 29 and a disc type valve 30 which is biased by a spring 31 toward a seated or closed position on a valve seat 32 for cutting off communication between a control pressure supply chamber 33 and a control pressure delivery chamber 34. The control pressure supply chamber 33 is connected to the double check valve device 3 via a passageway 35 (formed in the variable load valve device 2), a pipe 36, a passageway 37 (formed in the control valve device 1), and a pipe 38. The control pressure delivery chamber 34 is connected via a passageway 39 formed in the variable load valve device 2 to the pipe 25 and passageway 24 leading to control chamber 23 of the relay valve portion 8.

A control pressure area 40 at the end of piston 29 closest control pressure delivery chamber 34 is subject to the force of control pressure prevailing in said delivery chamber via a port 41 formed in a separating wall between said delivery chamber and said piston. The opposite end of piston 29 comprises an air spring pressure area 42 (smaller than area 40) exposed to an air spring pressure chamber 43 and, therefore, subject to the force of existing vehicle air spring pressure in said chamber, which is connected to the vehicle air springs (one of which is shown symbolically in FIG. 1 of the drawing and labeled accordingly) via a passageway 44 (formed in the multisectioned casing 28), a pipe 45, a passageway 46 (formed in the control valve device 1), and a pipe 47 connected to said air springs. A biasing or tuning spring 48, disposed in chamber 43 and compressibly adjustable by a screw 49, cooperates with the force of air spring pressure in said chamber for urging the piston 29 in a left hand direction toward a control pressure supply position, in which it is shown in the drawing and in which valve 30 is moved to an unseated or open position (as shown in the drawing) by a valve stem 50 associated therewith and actuated by said piston. In its unseated or open position, valve 30 places control pressure supply chamber 33 in communication with control pressure delivery chamber 34.

Piston 29 of the variable load valve device 2 also has formed thereon, intermediate the pressure areas 40 and 42, a supplemental or intermediate pressure area 51 exposed to fluid pressure in an intermediate chamber 52 formed adjacent thereto, so as to exert a force on said piston directed in the same direction as that of the force produced by spring 48 and air pressure in chamber 43. Intermediate chamber 52 is connected to the double check valve device 3 via a passageway 53, a pipe 54 and a pipe 55, the latter being connected to the pipe 20 leading to said double check valve device.

The double check valve device 3 as seen in FIG. 1, comprises a disc type valve member 56 subjectable to respective fluid pressures on opposite sides thereof so as to occupy either an emergency position or a service position, depending upon which pressure, acting on one or the other of said opposite sides, prevails. The lower side of valve member 56, as viewed in the drawing, is subjectable to the pressure of fluid prevailing in pipe 20, and the upper side is subjectable, via a passageway 57, to pressure of fluid prevailing in a pipe 58, the purpose of which will be set forth hereinafter. When the valve member 56 is in its service position, in which it is shown in the drawing, pipe 58 is in communication with pipe 38 via passageway 57 and a passageway 59 to which pipe 38 is connected; when valve member 56 is in its emergency position, communication between pipes 38 and 58 is cut off, and pipe 38 is placed in communication with pipe 20.

A check valve 60 is interposed in pipe 55 between pipe 20 and said pipe 55, so that flow may occur in the direction indicated by the arrow, that is, from pipe 20 to pipe 54. A check valve device 61 is interposed in a pipe 62 also connecting pipe 20 with pipe 54 in parallel relation to pipe 55, the direction of flow through the check valve device 61 being in a direction opposite to that of check valve device 60, as in dicated by the arrow, that is, from pipe 54 to pipe 20. Both check valve devices 60 and 61 are provided with respective valve members (not shown) and respective biasing springs (not shown) acting thereon in opposing relation to the direction of fluid pressure flow, as indicated. The springs may be preset to cut off flow of fluid under pressure through the respective pipes 55 and 62 when the desired preselected degree of pressure has been attained in chamber 52. Since the volume comprising chamber 52, passageway 53, and pipe 54 is a trapped or closed volume on the downstream side of check valve 60, the pressure in said closed volume can build up only to a degree equivalent to the differential between the pressure of fluid on the upstream side of said check valve and the pressure exerted by the biasing spring on the downstream side.

Since the invention herein disclosed is primarily concerned with the emergency application function of the variable load brake control apparatus above described, the details of operation of the service brake application are not deemed essential to an understanding of the invention, and therefore only very brief mention will be made of the service application function of the apparatus. It will be assumed that air spring pressure chamber 43 of the variable load valve device 2 is charged with air pressure via pipe 47, passageway 46 (in the control valve device 1), pipe 45 and passageway 44 (in said variable load valve device), the degree of said air pressure corresponding to that in the air springs.

In making a service brake application (greater details of which are not deemed essential to an understanding of the present invention), the operator moves an operating handle (not shown) of an automatic brake valve (not shown) into a preselected position of a service application zone, whereby a straight air pipe (not shown) is charged from a feed valve pipe (not shown) with control fluid pressure at a degree determined by the amount of movement of the handle. Control fluid pressure, at a degree corresponding to that of the straight air pipe is delivered via passageways (not shown) in the control valve device 1 from said straight air pipe to pipe 58 which is connected to passageway 57 of the double check valve device 3.

With control fluid pressure in pipe 58 and with such pressure prevailing on the upper side of valve member 56, said valve member assumes and is retained in its service position, above defined, wherein such control fluid pressure flows by way of passageway 59, pipe 38, passageway 37 (in control valve device 1), pipe 36, and passageway 35 (in the variable load valve device 2) to the control pressure supply chamber 33, thence past the unseated valve 30 into control pressure delivery chamber 34, and through port 41 to act on the control pressure area 40 of piston 29. Such control fluid pressure also flows from the delivery chamber 34 to chamber 23 of the relay valve portion 8 via passageway 39, pipe 25, and passageway 24 (in the control valve device 1). Fluid pressure in chamber 23 of the relay valve portion 8 causes the self-lapping valve means (not shown) to effect communication between passageways 12 and 26, whereby operating fluid pressure is delivered via pipe 27 to the brake cylinder device 4 which is actuated to effect a service brake application on the vehicle. The degree of brake application is determined by the degree of fluid pressure delivered to the brake cylinder device 4. The self-lapping valve means, in well-known manner, operates to cut off and then maintain the supply of fluid under pressure to the brake cylinder device 4 at a degree determined by the degree of control pressure established in chamber 23.

The degree of control pressures delivered to and established in chamber 23 is determined by that of the control pressure supplied to the variable load valve device 2, such degree of control pressure delivered to chamber 23, however, being limited to a certain maximum degree by said variable load valve device in accordance with the existing load on the vehicle. If the degree of control fluid pressure acting on pressure area 40 of piston 29 is such that the force produced thereby is sufficient for balancing the opposing combined forces of spring 48 and air spring pressure acting on pressure area 42, said piston is moved in a right-hand direction (as viewed in FIG. 2) out of a normal position, in which it is shown in FIG. 2, to a cut-off position in which spring 31 may then move valve 30 to its closed position on valve seat 32 to cut off further delivery of control pressure to the relay valve portion 8, as above described, thereby limiting the degree of service brake application accordingly, that is, to a certain maximum determined by the vehicle load condition.

Partial or complete release of the brake application (the details of which are not deemed essential to an understanding of this invention) is effected by movement of the operating handle of the automatic brake valve (above mentioned) toward or into a brake release position, whereby further supply of control fluid pressure, at the degree to which the straight air pipe had been previously charged, to pipe 58 and, therefore, to supply chamber 33 of the variable load valve device 2 is terminated. At the same time, supply chamber 33 is placed in communication with an atmospheric vent 63 via which control pressure in said supply chamber is reduced for effecting restoration of valve 30 to its open or unseated position, thus permitting control fluid pressure prevailing in chamber 34 of said variable load valve device and in chamber 23 of the relay valve portion 8 to be partially or completely vented back through the variable load valve device and other passageways (not shown) in the control valve device 1 to atmosphere via said vent 63 in said control valve device. Venting of chambers 34 and 23 results in restoration of piston 29 and piston 21 to their respective normal and release positions (above defined), and the self-lapping mechanism (not shown) in the relay valve portion 8 is restored to a normal position in which communication between passageways 12 and 26 is interrupted. Passageway 26 is thus placed in communication with a passageway 64 leading to an atmospheric vent 65 whereby brake cylinder device 4 is either partially or completely vented to atmosphere via pipe 27, passageways 26 and 64, and vent 65.

As above implied, the invention herein disclosed is primarily concerned with the emergency brake application function and is, therefore, rendered effective each time an emergency brake application is initiated. As is well known to those skilled in the art, the degree of an emergency brake application, when effected by the same apparatus, is the same each time the emergency application is effected, that is, a certain maximum degree, except as limited by the variable load valve device 2 in accordance with the existing vehicle load. According to the invention, however, this maximum degree of braking effort, during an emergency application, is supplemented by a certain additional increment of braking effort each time such an emergency application is effected.

When the operator initiates an emergency application, he does so in the usual manner by causing the pressure in brake pipe 6 to be reduced at such a rapid rate (as compared to the rate for a service application) that a sufficient differential is established across piston 9 of the emergency portion 7 to cause movement of said piston and spool valve 17 to the emergency application position, above defined, in which connection is made between passageways 12 and 19. Control fluid under pressure, therefore, from the supply reservoir 5, which is charged from the feed valve pipe (not shown) and, therefore, maintained at a constant pressure, is supplied to chamber 33 of the variable load valve device 2 via pipe 11, passageway 12, passageway 19, pipe 20, past valve 56 (which is moved to its emergency position, above defined, by the prevailing pressure in pipe 20 acting on the lower side thereof), passageway 59, pipe 38, passageway 37, pipe 36, and passageway 35. At the same time, fluid under pressure from pipe 20 also flows through pipe 55, check valve 60, pipe 54, and passageway 53 (in the variable load valve device 2) into intermediate chamber 52 to act on pressure area 51.

Although, as above noted and by using other apparatus above described, it is possible to provide an additional increment of braking effort (during an emergency application) in excess of the maximum degree normally permitted by the variable load valve device (according to vehicle load), such additional increment is variable according to vehicle load because the pressure delivered to the supplemental pressure area of the variable load valve device is air spring pressure which varies according to vehicle load. Since, according to the present invention, however, it is emergency control fluid pressure that is delivered to intermediate chamber 52, and since the degree of such emergency control fluid pressure is a fixed degree corresponding to that prevailing in the supply reservoir 5, the degree of control fluid pressure delivered to said intermediate chamber during an emergency brake application is the same, that is, a certain measured degree, each time such an application is effected, notwithstanding that the degree of such emergency control pressure may be limited by the setting of check valve 60 to a preselected degree less than maximum emergency control fluid pressure. Thus, the force of such measured control pressure acting on area 51, when combined with that of spring 48 and that of air spring pressure acting on pressure area 42, requires a greater opposing force of control pressure acting on area 40 than is required during a service application or would be required during an emergency application in the absence of emergency control pressure acting on supplemental pressure area 51, for balancing said combined forces and effecting movement of piston 29 to its cut-off position, above described. Thus, with the invention herein disclosed, the maximum braking effort normally attainable during an emergency application for the existing vehicle load, is supplemented by an additional measured increment of braking effort.

In effecting a release of the emergency application, the operator causes the brake pipe 6 and, consequently, chamber 14 of the emergency valve portion 7 to be recharged, whereupon piston 9 and spool valve 17 are restored to respective release positions in which further supply of fluid pressure to chamber 33 of the variable load valve device 2 is cut off (by interrupting communication between passageways 12 and 19) and such pressure in said chamber 33 is vented to atmosphere via passageway 35, pipe 36, passageway 37, pipe 38, passageway 59, past the unseated valve member 56, pipe 20, passageway 19, and to atmosphere via a passageway (not shown) in the emergency portion 7, and an atmospheric vent 66 in said emergency valve portion. With pressure released from chamber 33 of the variable load valve device 2, valve member 30 is unseated by pressure in chamber 34, so that such pressure in chamber 34 is also released via the course immediately above described. Piston 29 is thus restored to its normal position in which valve 30 is maintained in its open position.

With passageway 19 open to atmosphere for venting chamber 23 of the relay valve portion 8 and chambers 34 and 33 of the variable load valve device 2 to atmosphere, as above described, intermediate chamber 52 of said variable load valve device also vents to atmosphere via passageway 53, pipe 54, pipe 62, check valve 61, and said pipe 20, passageway 19, and vent 66. The variable load valve device 2 is thus restored to a normal brake release condition until a subsequent application, either service or emergency, is effected.

Since the check valve 60 is interposed in pipe 55 for limiting the degree of fluid pressure delivered to intermediate chamber 52 of the variable load valve device 2 to a preselected pressure, the check valve 61 and pipe 62, arranged in parallel relation to said check valve 60 and pipe 55, are necessary to permit venting of said chamber pipe 55 upon release of an emergency application.

DESCRIPTION AND OPERATION—FIG. 4

Under certain conditions or perhaps because of the particular type of brake equipment used, it may not be desirable to limit the degree of emergency control fluid pressure delivered to the intermediate chamber 52 of the variable load valve device 2 when an emergency brake application is effected. That is, it may be more desirable to permit pressurized fluid from the supply reservoir 5 to be delivered (in the manner above described) to chamber 52 at the same pressure at which it is stored in said reservoir, which pressure, as above noted and for all practical purposes, is maintained at a constant degree. This objective may be obtained by the arrangement shown in FIG. 4 of the drawings.

In the arrangement shown in FIG. 4, chamber 52 of the variable load valve device 2 is connected directly, via passageway 53 and a pipe 67, to pipe 20, which is connected to the double check valve device 3 and through which, by way of said double check valve device, control fluid pressure is also supplied to the control pressure supply chamber 33 of said variable load valve device, in the manner above described, when an emergency application is effected. This arrangement eliminates the use of both the check valves 60 and 61 and of the additional pipe 62.

Since the pressure in storage reservoir 5, as above noted, is maintained at a constant degree of pressure, fluid pressure delivered therefrom to the intermediate chamber 52 of the variable load valve device 2, is, therefore, at the same degree of pressure each time an emergency application is effected. Thus, whether the load brake control apparatus herein disclosed is provided with the preset check valves 60 and 61, as shown in FIG. 1, which are effective in providing an additional increment of braking effort of certain degree less than that which would be provided by maximum emergency control pressure, or is simply arranged with the connecting pipe 67, as shown in FIG. 4, to produce an additional increment of braking effort greater than said certain degree, that is, as effected by the maximum emergency control pressure, in either case the additional increment of braking effort effected by each arrangement is constant for the particular apparatus employed for each occurrence of an emergency brake application.

Having now described the invention, what I claim as new and desire to secure by Letters Patent, is:

1. In a vehicle variable load brake control apparatus, the combination of:
 (a) means for selectively effecting a service brake application on the vehicle at a preselected degree up to a certain high degree or an emergency brake application at a degree equivalent to said certain high degree, and
 (b) valve means for limiting both said service brake application and said emergency brake application to respective maximum degrees commensurate with the existing load condition of the vehicle, wherein the improvement comprises:

(c) means effective for conditioning said valve means to limit an emergency brake application to a degree exceeding said maximum degree by a predetermined uniform increment, notwithstanding variations in the load on the vehicle.

2. The combination, as set forth in claim 1, wherein the last-said means comprises means operably responsive to fluid under pressure supplied incidental to initiation of an emergency brake application.

3. A vehicle variable load brake control apparatus including a brake cylinder for effecting a brake application on the vehicle at a degree corresponding to the degree of a control fluid pressure, and control means operable responsively to initiation of a service brake application for providing a service control fluid pressure at a preselected degree up to a certain high degree, and to initiation of an emergency brake application for providing an emergency control fluid pressure at a predetermined degree greater than said certain high degree and valve means for limiting the service control fluid pressure and the emergency control fluid pressure to different maximum degrees commensurate with the existing load condition of the vehicle, wherein the improvement comprises means effective for conditioning said valve means to limit said emergency control fluid pressure to a degree exceeding the maximum degree for said emergency control fluid pressure by a predetermined uniform increment, notwithstanding variations in the load on the vehicle.

4. The combination, as set forth in claim 3, wherein said means comprises means operably responsive to said emergency control fluid pressure supplied incidental to initiation of an emergency brake application.

5. In a vehicle variable load brake control apparatus including a brake cylinder operable responsively to fluid under pressure for effecting a brake application on the vehicle at a degree corresponding to the degree of fluid pressure delivered to the brake cylinder, a source of fluid under pressure, and control means operable responsively to initiation of a service brake application for providing a service control fluid pressure at a preselected degree up to a certain high degree, and to initiation of an emergency brake application for providing an emergency control fluid pressure at a fixed predetermined degree greater than said certain high degree, the combination of:

(a) relay valve means alternatively operable responsively to said service and said emergency control fluid pressures for effecting supply of fluid from the source to the brake cylinder at a pressure corresponding to that of the respective control pressure delivered to said relay valve means;

(b) a variable load valve device including piston-valve means subjected on one side to one force determined by the existing vehicle load and being normally operable responsively to said one force to an open position in which either said service control fluid pressure or said emergency control fluid pressure is delivered to said relay valve means, said piston-valve means being subjectable on an opposite side to an opposing force exerted by the prevailing control fluid pressure and being operable, upon balancing of said one force by said opposing force, to a closed position in which delivery of said prevailing control fluid pressure to said relay valve means is cut off; and (c) check valve means for selectively effecting supply of either said service control fluid pressure or said emergency control fluid pressure, depending upon which type of brake application is initiated, to said variable load valve device for delivery to said relay valve means and for exerting said opposing force on said opposite side of said piston valve means; wherein the improvement comprises:

(d) a supplemental pressure area formed on said piston valve means, and (e) conduit means via which emergency control fluid pressure delivered to said opposite side of said piston valve means is concurrently communicated to said supplemental pressure area to exert thereon an additional force incrementally supplementing said one force so as to necessitate a corresponding increase in said opposing force to a value effective for balancing said one force, as incrementally increased, and for effecting operation of said piston-valve means to its said closed position upon each occurrence of an emergency brake application.

6. The combination, as set forth in claim 5, further characterized by means interposed in said conduit means for limiting the degree of said emergency control fluid pressure communicated to said supplementary pressure area to a preselected degree less than said fixed predetermined degree.

7. In a vehicle variable load brake control apparatus, the combination comprising:

(a) a brake-applying device operable responsively to fluid under pressure for effecting a brake application on the vehicle at a degree corresponding to that of the fluid pressure supplied thereto;

(b) a source of fluid under pressure;

(c) a brake pipe normally charged with fluid at a preselected pressure;

(d) control means effective upon initiation of a service brake application for providing a service control fluid pressure at a preselected degree up to a certain high degree and being operable responsively to a reduction of fluid pressure in said brake pipe at a certain rate for providing an emergency control fluid presure at a fixed predetermined degree greater than said certain high degree;

(e) relay valve means alternatively operable responsively to said service and said emergency control fluid pressures for effecting supply of pressurized fluid from said source to said brake-applying device at a pressure corresponding to that of the respective control fluid pressure delivered to said relay valve means;

(f) a variable load valve device including piston-valve means subjected on one side to one force determined by the existing vehicle load and being normally operable responsively to said one force to an open position in which either said service control fluid pressure or said emergency control fluid pressure is delivered to said relay valve means, said piston-valve means being subjectable on an opposite side to an opposing force exerted by the prevailing control fluid pressure and being operable, upon balancing of said one force by said opposing force, to a closed position in which delivery of said prevailing control fluid pressure to said relay valve means is cut off for limiting said fluid under pressure supplied to said brake-applying device to a certain maximum pressure; and (g) check valve means having one position in which said service control fluid pressure is supplied to said variable load valve device for delivery to said relay valve means and for acting on said opposite side of said piston-valve means, said check valve means being subjected to and operable responsively to said emergency control fluid pressure to a different position in which said emergency control fluid pressure is supplied to said variable load valve device for delivery to said relay valve means and for acting on said opposite side of said piston valve means; wherein the improvement comprises:

(h) a supplemental pressure area formed on said piston-valve means, and (i) conduit means via which said emergency control fluid pressure, when supplied to said variable load valve device, upon occurrence of brake pipe pressure reduction, is concurrently communicated to said supplementary pressure area to exert thereon an additional force supplementing said one force so as to necessitate a corresponding increase in said opposing force to a value effective for balancing said one force, as incrementally increased, and for effecting operation of said piston-valve means to its said closed position upon each occurrence of an emergency brake application.

8. The combination, as set forth in claim 7, wherein said control means comprises an emergency valve portion in communication with said check valve means and operable responsively to said reduction of brake pipe pressure for establishing said emergency control fluid pressure.

References Cited

UNITED STATES PATENTS

| | | | |
|---|---|---|---|
| 3,275,380 | 9/1966 | May | 303—22 X |
| 3,443,842 | 5/1969 | Pier | 303—22 X |
| 3,460,870 | 8/1969 | Kirk | 303—22 |

MILTON BUCHLER, Primary Examiner

J. J. McLAUGHLIN, Jr., Assistant Examiner

U.S. Cl. X.R.

303—27